May 14, 1929.  G. W. HEBBELER  1,712,824

BATTERY CABLE CONNECTION CLAMP

Original Filed May 7, 1926

Inventor
George W. Hebbeler
By Cornwall, Bedell & James
ATTYS.

Patented May 14, 1929.

1,712,824

UNITED STATES PATENT OFFICE.

GEORGE WILLIAM HEBBELER, OF ST. LOUIS, MISSOURI.

BATTERY CABLE CONNECTION CLAMP.

Original application filed May 7, 1926, Serial No. 107,395. Divided and this application filed November 26, 1926. Serial No. 150,898.

My invention relates to batteries and cable connections and consists in an improved clamp for the post of a storage battery, which clamp is detachably secured to the end of a cable leading to or from the battery.

This application is a division of my pending application Serial No. 107,395, filed May 7, 1926.

The main object of my invention is to provide a clamp which may be easily applied to the battery post or the cable, or easily removed from either or both the post and the cable.

An additional object of my invention is to provide a clamp which is adapted to be applied either to a cylindrical post or to a tapered post.

An additional object of my invention is to provide a cable clamp which will be economical to manufacture and which will serve to maintain engagement between the post and clamp throughout a maximum contact area.

In the accompanying drawings which illustrate my invention—

Figure 1:
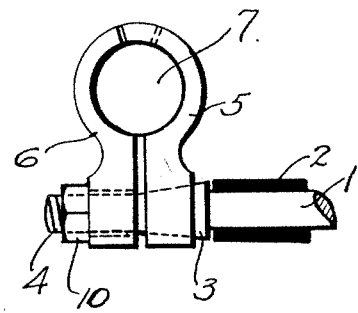
Figure 1 is a top view of my clamp applied to a cable and battery post.
Figure 2:
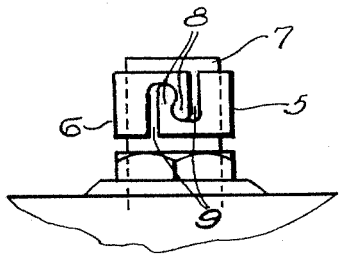
Figure 2 is a side elevation of the parts shown in Figure 1.
Figure 5:
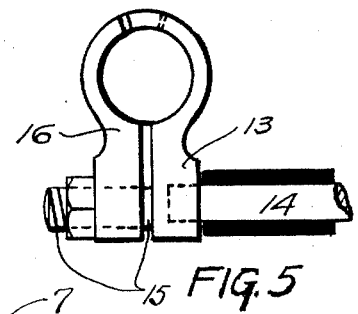
Figure 5 is a top view illustrating another modification.
Figure 3:
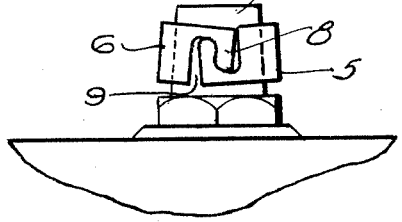
Figure 3 is a similar side elevation showing the clamp applied to a tapered battery post.

The battery cable 1 is provided with the usual insulation 2 and beyond the end of the latter is provided with a tapered head 3 terminating in a threaded cylindrical portion 4.

The clamp comprises elements 5 and 6 which are alike except that element 5 has a tapered hole for receiving and fitting against the tapered portion 3 of the cable terminal and element 6 has a cylindrical opening for receiving the threaded portion 4 of the cable terminal member 3.

The ends of elements 5 and 6 opposite to the perforated portions form jaws which are interengaged to provide a hinge-like connection which will permit the elements to pivot on each other in a horizontal plane and in a vertical plane extending transversely of the post 7. I show the interengagement being provided by lugs 8 on the ends of each element, and a recess 9 in each element just inside of the lug 8 for receiving the lug 8 on the other element.

When the cable is to be applied to a post the two clamp elements 5 and 6 are hooked into each other over the post and placed over the cable terminal member 3—4, and the nut 10 tightened up. When it is desired to remove the clamp, loosening of nut 10 enables the clamp elements to be easily separated from the post without necessarily separating them from the cable as both ends of the clamp elements may be easily separated from each other and the clamp elements may be loosened from the post all around the latter. The ordinary clamp in general use is made of a single piece which must be bent to be tightened and to be removed and is often very difficult to remove from the post.

The knuckle joint between the clamp elements provides maximum contacting surfaces substantially throughout the length and width of the jaw portions irrespective of the angle at which the clamp elements may be placed.

Figure 4:
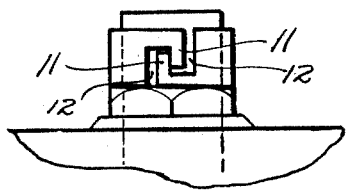
Figure 4 is a similar elevation illustrating a modified form of my invention.

In the modified form illustrated in Figure 4, the lugs 11 on the ends of the clamps and the corresponding recesses 12 for receiving the lugs have straight sides.

In Figure 6 I illustrate another modified form of my invention in which the clamp element 13 is soldered or otherwise secured to the cable 14 and has the stem 15 formed integrally therewith or fixed thereto. The other clamp element 16 corresponds to element 6 in the preferred form.

This construction may be desirable in some instances and while not as adaptable as my preferred structure, nevertheless embodies the same general principles.

Obviously modification in the details of my invention other than those shown may be made without departing from the spirit thereof, and I contemplate the exclusive use of such variations as fall within the scope of my claims.

I claim:

1. In a battery terminal post and cable connection, semicircular clamp elements pivotally assembled with each other by interengagement of their respective ends, each of said ends being provided with a lug and a recess adjacent said lug, the surface forming the common side of the lug and recess being a reverse curve, whereby the two clamp elements may be inclined bodily relatively to each other.

2. In a connection for a battery post and cable, clamping arms having semi-circular jaws provided with interengaging elements flush with the bodies of the jaws and with each other, said elements forming a connection for said jaws constructed to provide substantial pivotal movement of the latter transversely and longitudinally of the post to be engaged, said arms cooperating to form a substantially continuous post engaging surface, and means for drawing said arms together.

3. In a connection for a battery terminal post, a pair of curved arms the inner surface of each arm being formed of straight line elements, each arm having an end portion flush with the body of the arm and provided with a projection and recess extending longitudinally of said elements and engaged with the recess and projection respectively in the corresponding end of the other arm and lying flush therewith and forming a joint about which the arms can pivot substantially to and from each other transversely of the post or can pivot substantially to incline towards each other lengthwise of the post.

4. In a cable terminal connection for battery posts, a pair of rigid cooperating clamping members, each of which is provided with a semi-circular clamping jaw having one end formed with a circumferentially and longitudinally disposed hook and a recess disposed reversely to said hook, whereby the hook of one jaw is adapted to enter the recess of the other jaw in cooperative relation with the hook of the latter, thereby maintaining said jaws in concentric relation and forming a pivotal connection between said jaws for adjusting the latter transversely of the longitudinal axis of said jaws and of the battery post, the opposite ends of said jaws being provided with lugs adapted to be secured to one end of a cable.

5. In a cable terminal for battery posts, a pair of cooperating clamping members, each of which is provided with a semi-circular clamping jaw having one end formed with a circumferentially and longitudinally disposed hook and a recess disposed reversely to said hook, whereby the hook of one jaw is adapted to enter the recess of the other jaw with the juxtaposed edges of said hooks in abutting engagement, thereby providing rocking movement of said jaws transversely of the longitudinal axis thereof and of the battery post, the opposite ends of said clamping members being extended radially and forming lugs having transverse aligned apertures for receiving one end of a cable.

6. In a cable terminal for battery posts, a pair of cooperating clamping members, each of which is provided with a semi-circular clamping jaw having one end formed with a circumferentially and longitudinally presented hook and a recess disposed reversely to said hook, the ends of said recess and said hook being rounded whereby the hook of one jaw is adapted to enter the recess of the other jaw and form a pivotal connection between said jaws, said pivotal connection being disposed transversely to the axis of the circular opening formed by said jaws, thus providing adjustment of said jaws transversely of the longitudinal axis of the battery post, the opposite ends of said jaws being provided with laterally projecting lugs, and means for drawing said lugs together to clamp said members on the battery post.

In testimony whereof I hereunto affix my signature this 24th day of November, 1926.

GEORGE WILLIAM HEBBELER.